United States Patent
Li

(10) Patent No.: US 12,028,144 B2
(45) Date of Patent: Jul. 2, 2024

(54) METHOD AND DEVICE FOR REPORTING BEAM FAILURE OF SECONDARY SERVING CELL, AND STORAGE MEDIUM

(71) Applicant: Beijing Xiaomi Mobile Software Co., Ltd., Beijing (CN)

(72) Inventor: Mingju Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 661 days.

(21) Appl. No.: 17/274,273

(22) PCT Filed: Sep. 10, 2018

(86) PCT No.: PCT/CN2018/104889
§ 371 (c)(1),
(2) Date: Mar. 8, 2021

(87) PCT Pub. No.: WO2020/051744
PCT Pub. Date: Mar. 19, 2020

(65) Prior Publication Data
US 2021/0314050 A1    Oct. 7, 2021

(51) Int. Cl.
*H04W 72/00* (2023.01)
*H04B 7/06* (2006.01)
(Continued)

(52) U.S. Cl.
CPC .......... *H04B 7/0695* (2013.01); *H04W 24/10* (2013.01); *H04W 72/21* (2023.01); *H04W 74/0833* (2013.01); *H04W 76/11* (2018.02)

(58) Field of Classification Search
CPC ..... H04L 5/001; H04L 1/0026; H04L 5/0048; H04B 7/0695; H04B 7/061; H04B 7/0632;
(Continued)

(56) References Cited

U.S. PATENT DOCUMENTS

2016/0262118 A1    9/2016 Kim et al.
2018/0110066 A1    4/2018 Luo et al.
(Continued)

FOREIGN PATENT DOCUMENTS

CN    107079459 A    8/2017
CN    108112074 A    6/2018
(Continued)

OTHER PUBLICATIONS

Intel Corporation, "On SCell Beam Failure Recovery", 3GPP TSG RAN WG1 Meeting #94 R1-1808720, Gothenburg, Sweden, Aug. 20-24, 2018, 4 pages (Year: 2018).*
(Continued)

*Primary Examiner* — Lan-Huong Truong
(74) *Attorney, Agent, or Firm* — Finnegan, Henderson, Farabow, Garrett & Dunner, L.L.P.

(57) ABSTRACT

The present disclosure relates to a method and device for reporting a beam failure of a secondary cell (SCell) and a storage medium. The method includes: determining, by user equipment (UE), that a first SCell has a beam failure; determining a target serving cell for transmitting a report message to a base station, the report message being configured to notify the base station that the first SCell has the beam failure; and transmitting the report message in the target serving cell. According to the embodiments of the present disclosure, the beam failure of the SCell of the UE is reported.

9 Claims, 7 Drawing Sheets

(51) Int. Cl.
*H04W 24/10* (2009.01)
*H04W 72/21* (2023.01)
*H04W 74/0833* (2024.01)
*H04W 76/11* (2018.01)

(58) Field of Classification Search
CPC . H04B 7/06964; H04B 17/328; H04W 24/10; H04W 72/21; H04W 74/0833; H04W 76/11; H04W 74/006; H04W 72/046; H04W 72/542; H04W 24/08; H04W 72/1268
See application file for complete search history.

(56) References Cited

U.S. PATENT DOCUMENTS

| | | | |
|---|---|---|---|
| 2018/0138962 A1 | 5/2018 | Islam et al. | |
| 2018/0367374 A1* | 12/2018 | Liu | H04W 16/28 |
| 2019/0053288 A1* | 2/2019 | Zhou | H04B 7/0626 |
| 2021/0400555 A1* | 12/2021 | Park | H04W 36/305 |

FOREIGN PATENT DOCUMENTS

| | | | |
|---|---|---|---|
| CN | 108513737 A | 9/2018 | |
| RU | 2479154 C2 | 4/2013 | |
| RU | 2566800 C2 | 10/2015 | |
| RU | 2586892 C2 | 6/2016 | |
| RU | 2592775 C2 | 7/2016 | |
| WO | WO 2018/017840 A1 | 1/2018 | |
| WO | WO 2018/129300 A1 | 7/2018 | |
| WO | WO-2019032882 A1 * | 2/2019 | H04B 7/0695 |

OTHER PUBLICATIONS

CMCC, "Discussion on beam failure recovery", 3GPP TSG RAN WG1 Meeting #94 R1-1808832, Gothenburg, Sweden, Aug. 20-24, 2018, 4 pages (Year: 2018).*
First Office Action of Russian Application No. 2021109621, dated Sep. 1, 2021.
Office Action of Russian Application No. 2022106018/07, dated Aug. 15, 2022.
Intel Corporation, "On SCell Beam Failure Recovery", 3GPP TSG RAN WG1 Meeting #94 R1-1808720, Gothenburg, Sweden, Aug. 20-24, 2018, 4 pages.
Huawei, HiSilicon, "Discussion on BFR-config for SCell BFR", 3GPP TSG-RAN WG2 Meeting 102 R2- 1807961, Busan, Korea, May 21-25, 2018, 7 pages.
Nokia, Nokia Shanghai Bell, "SCell Beam Failure Recovery", 3GPP TSG-RAN WG2 Meeting #101bis R2-1805342, Sanya, China, Apr. 16-20, 2018, 3 pages.
Extended European Search Report in European Application No. 18933222.4, dated Mar. 29, 2022.
Lenovo, Motorola Mobility, "Discussion of beam failure recovery for carrier aggregation", 3GPP TSG RAN WG1 Meeting #92 R1-1804211, Sanya, China, Apr. 16-20, 2018, 3 pages.
CMCC, "Discussion on beam failure recovery", 3GPP TSG RAN WG1 Meeting #94 R1-1808832, Gothenburg, Sweden, Aug. 20-24, 2018, 4 pages.
Nokia, Nokia Shanghai Bell, "Beam Recovery in NR", 3GPP TSG-RAN WG2 #100 R2-1713412, Reno, USA, Nov. 27-Dec. 1, 2017, 4 pages.
Vivo, "Discussion on the SCell Bfr", 3GPP TSG-RAN WG2 Meeting #102 R2-1807584, Busan, Korea, May 21-25, 2018, 5 pages.
Notice of Reasons for Refusal of Japanese Application No. 2021-512879, dated May 18, 2022.
Rapporteur (Nokia); "Beam management, failure detection and recovery", 3GPP TSG-RAN WG2 Meeting #103 R2-1813236, Gothenburg, Sweden, Aug. 20-24, 2018, 3 pages.
English version of International Search Report in International Application No. PCT/CN2018/104889, dated May 23, 2019.
English version of Written Opinion of the International Search Authority in the International Application No. PCT/CN2018/104889, dated May 23, 2019.
Huawei, HiSilicon; "non-contention based random access for beam failure recovery in CA", 3GPP TSG- RAN WG2#AH-1801 R2-1801049, Vancouver, Canada, Jan. 22-26, 2018, 3 pages.
Samsung; "Corrections on Beam Failure Recovery", 3GPP TSG RAN WG1 Meeting #92bis R1-1806716, Sanya, China, Apr. 16-20, 2018, 4 pages.
Huawei, HiSilicon; "Discussion on BFR for SCell", 3GPP TSG RAN WG1 Meeting #94 R1-1809120, Gothenburg, Sweden, Aug. 20-24, 2018, 6 pages.
First Office Action of Chinese Application No. 201880001379.4, dated Feb. 23, 2021.

* cited by examiner

METHOD AND DEVICE FOR REPORTING BEAM FAILURE OF SECONDARY SERVING CELL, AND STORAGE MEDIUM

CROSS REFERENCE TO RELATED APPLICATIONS

This application is a national phase application based on International Application No. PCT/CN2018/104889, filed Sep. 10, 2018, the content of which is incorporated herein by reference.

TECHNICAL FIELD

The present disclosure relates to the technical field of communication, and more particularly, to a method and device for reporting a beam failure of a secondary cell (SCell) and a storage medium.

BACKGROUND

In New Radio (NR) technology, particularly when a communication frequency is at frequency range 2 (6 GHz or above), there is a need to use beam-based transmission and reception to ensure the coverage range due to fast attenuation of high-frequency channels. In the NR, beam-based transmission and reception are also needed for control channels, therefore, when user equipment (UE) moves or an antenna rotates in direction, a reception (Rx) beam presently configured for a user of the UE to receive a Physical Downlink Control Channel (PDCCH) may have a beam failure.

Present protocol standards define reference signal (RS) resources for detecting a beam failure. When UE detects that all RSs in these RS resources have channel quality less than threshold #1, it is indicated that a beam failure occurs. At this time, the UE may detect, based on an RS resource configured by a base station for determining a candidate beam, whether RSs in the RS resource includes an RS with an L1-Reference Signal Received Power (L1-RSRP) meeting threshold #2; and if such an RS is included, the UE may transmit a random access preamble corresponding to the RS on a random access time-frequency resource corresponding to the RS to implicitly notify the base station that the UE has a beam failure in the cell and a new beam (i.e., the beam used by the RS corresponding to the random access time-frequency resource) is found. Then, the UE may detect a response message transmitted from a base station and wait for beam recovery.

However, the above process only defines a process of reporting and recovering a beam failure in a primary cell (PCell) of UE but no consideration is given to how to report and recover a beam failure in a secondary cell (SCell) of the UE.

SUMMARY

In order to overcome the problem in related art, the present disclosure provides a method and device for reporting a beam failure of a SCell and a storage medium.

According to a first aspect of the embodiments of the present disclosure, a method for reporting a beam failure of a SCell is provided, which may include that:
UE determines that a first SCell has a beam failure;
a target serving cell for transmitting a report message to a base station is determined, the report message being configured to notify the base station that the first SCell has the beam failure; and
the report message is transmitted in the target serving cell.

Optionally, the operation that the target serving cell for transmitting the report message to notify the base station that the first SCell has the beam failure is determined may include that:
a PCell of the UE is taken as the target serving cell, the first SCell belonging to a master cell group (MCG) controlled by a PCell base station; or,
a primary secondary cell (PScell) of the UE is taken as the target serving cell, the first SCell belonging to a secondary cell group (SCG) controlled by a SCell base station; or,
a serving cell of the UE other than the first Scell, the Pcell and the PScell, which is configured with a PUCCH/Physical Uplink Shared Channel (PUSCH)/Physical Random Access Channel (PRACH), is taken as the target serving cell.

Optionally, the operation that the target serving cell for transmitting the report message to notify the base station that the first SCell has the beam failure is determined may include that:
the first SCell is determined as the target serving cell; and
the operation that the report message is transmitted in the target serving cell may include that:
the report message is transmitted on a PUCCH/PUSCH/PRACH resource of the first SCell.

Optionally, the operation that the first SCell is determined as the target serving cell may include that:
whether the PUCCH/PUSCH/PRACH of the first SCell is available is determined; and
the first SCell is taken as the target serving cell when the PUCCH/PUSCH/PRACH of the first SCell is available.

Optionally, the operation that whether the PUCCH/PUSCH/PRACH of the first SCell is available is determined may include that:
an indication message is received from the base station, and whether the PUCCH/PUSCH/PRACH of the first SCell is available is determined based on the indication message; or,
whether reception and transmission of the UE have reciprocity is determined, and it is determined that the PUCCH/PUSCH/PRACH of the first SCell is available when the reception and transmission of the UE do not have the reciprocity.

Optionally, the operation that the report message is transmitted in the target serving cell may include that:
the report message is carried by a sequential value for transmitting L1-RSRP of a PUCCH/PUSCH of the target serving cell, the report message including a cell identifier of the first SCell and indication information for indicating that the beam failure occurs.

Optionally, the indication information may include identifier(s) of one or more RSs of the first SCell and L1-RSRP of the one or more RSs, and indicate that the beam failure occurs when bit value(s) of the L1-RSRP of the one or more RSs are all preset bit values.

Optionally, the operation that the report message is transmitted in the target serving cell may include that:
the report message is carried by a sequential value for feeding back a channel quality indicator (CQI) on a PUCCH/PUSCH of the target serving cell, the report message including a cell identifier of the first SCell and channel quality information of the first SCell, and indicating that the beam failure occurs when the first SCell has channel quality less than a preset threshold.

Optionally, the operation that the report message is transmitted in the target serving cell may include that:

the report message is carried by a resource for a scheduling request (SR) on a PUCCH/PUSCH of the target serving cell, the report message including a cell identifier of the first SCell and indication information for indicating that the beam failure occurs.

Optionally, the operation that the report message is transmitted in the target serving cell may include that:

a report message of a predefined format is transmitted on a PUCCH/PUSCH of the target serving cell, the predefined format specifying a bit for carrying the report message on the PUCCH/PUSCH, a bit value representing a cell identifier of the first SCell, and a bit value representing indication information for indicating that the beam failure occurs.

Optionally, the operation that the report message is transmitted in the target serving cell may include that:

a preset PRACH time-frequency code resource is received from the base station, the preset PRACH time-frequency resource being configured to transmit report information that the first SCell has the beam failure; and a preset random access preamble is transmitted on the preset PRACH time-frequency resource, to notify the base station that the first SCell of the UE has the beam failure.

Optionally, the operation that the report message is transmitted on the PUCCH/PUSCH resource of the first SCell may include that:

the report message is carried by a sequential value for transmitting an L1-RSRP of the PUCCH/PUSCH of the first SCell, the PUCCH/PUSCH on the first SCell being available.

Optionally, the report message may include identifier(s) of one or more RSs of the first SCell and L1-RSRP of the one or more RSs, and indicate that the first SCell has the beam failure when bit value(s) of the L1-RSRP of the one or more RSs are all preset bit values.

Optionally, the operation that the report message is transmitted on the PUCCH/PUSCH resource of the first SCell may include that:

the report message is carried by a sequential value for feeding back a CQI on the PUCCH/PUSCH of the first SCell, the report message including channel quality information of the first SCell, and indicating that the first SCell has the beam failure when the first SCell has channel quality less than a preset threshold, the PUCCH/PUSCH on the first SCell being available.

Optionally, the operation that the report message is transmitted on the PRACH resource of the first SCell may include that:

whether an RS corresponding to a new candidate beam exists is detected on the first SCell; and if the UE detects the RS corresponding to the new candidate beam, a corresponding random access preamble is transmitted on a PRACH time-frequency resource of the first SCell corresponding to the RS of the new candidate beam, to notify the base station that the first SCell of the UE has the beam failure, the PRACH on the first SCell being available.

Optionally, the operation that the report message is transmitted in the target serving cell may include that:

configuration signaling is received from the base station; and a time-frequency code resource of the report message is transmitted through a PUCCH/PUSCH/PRACH configured by the target serving cell based on the configuration signaling.

Optionally, the method may further include that:

configuration information for beam measurement and report of the first SCell is received from the base station; and the beam measurement is performed based on the configuration information and a candidate beam obtained by the measurement is reported, the candidate beam being used by the base station for updating a beam configuration of the first SCell.

According to a second aspect of the embodiments of the present disclosure, a device for reporting a beam failure of a SCell is provided, which may include:

a first determination module, configured to determine that a first SCell has a beam failure;

a second determination module, configured to determine a target serving cell for transmitting a report message to a base station, the report message being configured to notify the base station that the first SCell has the beam failure; and a transmitting module, configured to transmit the report message in the target serving cell.

Optionally, the second determination module may include:

a first determination submodule, configured to take a PCell of UE as the target serving cell, the first SCell belonging to an MCG controlled by a PCell base station; or, a second determination submodule, configured to take a PScell of the UE as the target serving cell, the first SCell belonging to an SCG controlled by a SCell base station;

or, a third determination submodule, configured to take a serving cell of the UE other than the first Scell, the Pcell and the PScell, which is configured with a Physical UPLINK Control Channel (PUCCH)/Physical Uplink Shared Channel (PUSCH)/Physical Random Access Channel (PRACH), as the target serving cell.

Optionally, the second determination module may include a fourth determination submodule, configured to determine the first SCell as the target serving cell; and the transmitting module is configured to transmit the report message on a PUCCH/PUSCH/PRACH resource of the first SCell.

Optionally, the device may further include:

a determination module, configured to determine whether the PUCCH/PUSCH/PRACH of the first SCell is available.

The fourth determination submodule may be configured to take the first SCell as the target serving cell when the PUCCH/PUSCH/PRACH of the first SCell is available.

Optionally, the determination module may include: a receiving submodule, configured to receive an indication message from the base station; and a first availability determination submodule, configured to determine whether the PUCCH/PUSCH/PRACH of the first SCell is available based on the indication message; or, the determination module may include: a determination submodule configured to determine whether reception and transmission of the UE have reciprocity; and a second availability determination submodule configured to determine that the PUCCH/PUSCH/PRACH of the first SCell is available when the reception and transmission of the UE do not have the reciprocity.

Optionally, the transmitting module may include a first transmitting submodule, configured to:
carry the report message by a sequential value for transmitting an L1-RSRP of a PUCCH/PUSCH of the target serving cell, the report message including a cell identifier of the first SCell and indication information for indicating that the beam failure occurs.

Optionally, the indication information may include identifier(s) of one or more RSs of the first SCell and L1-RSRP of the one or more RSs, and indicate that the beam failure occurs when a bit value(s) of the L1-RSRP of the one or more RSs are all preset bit values.

Optionally, the transmitting module may include a second transmitting submodule, configured to:
carry the report message by a sequential value for feeding back a CQI on a PUCCH/PUSCH of the target serving cell, the report message including a cell identifier of the first SCell and channel quality information of the first SCell, and indicating that the beam failure occurs when the first SCell has channel quality less than a preset threshold.

Optionally, the transmitting module may include a third transmitting submodule, configured to:
carry the report message by a resource for an SR on a PUCCH/PUSCH of the target serving cell, the report message including a cell identifier of the first SCell and indication information for indicating that the beam failure occurs.

Optionally, the transmitting module may include a fourth transmitting submodule, configured to:
transmit a report message of a predefined format on a PUCCH/PUSCH of the target serving cell, the predefined format specifying a bit for carrying the report message on the PUCCH/PUSCH, a bit value representing a cell identifier of the first SCell, and a bit value representing indication information for indicating that the beam failure occurs.

Optionally, the transmitting module may include:
a first receiving submodule, configured to receive a preset PRACH time-frequency code resource from the base station, the preset PRACH time-frequency resource being configured to transmit report information that the first SCell has the beam failure; and
a fifth transmitting submodule, configured to transmit a preset random access preamble on the preset PRACH time-frequency resource, to notify the base station that the first SCell of the UE has the beam failure.

Optionally, the transmitting module may include a sixth transmitting submodule, configured to:
carry the report message by a sequential value for transmitting an L1-RSRP of a PUCCH/PUSCH of the first SCell, the PUCCH/PUSCH on the first SCell being available.

Optionally, the report message may include identifier(s) of one or more RSs of the first SCell and L1-RSRP of the one or more RSs, and indicate the first SCell has the beam failure when bit value(s) of the L1-RSRP of the one or more RSs are all preset bit values.

Optionally, the transmitting module may include a seventh transmitting submodule, configured to:
carry the report message by a sequential value for feeding back a CQI on a PUCCH/PUSCH of the first SCell, the report message including channel quality information of the first SCell and indicating that the first SCell has the beam failure when the first SCell has channel quality less than a preset threshold, and the PUCCH/PUSCH on the first SCell being available.

Optionally, the transmitting module may include:
a detection submodule, configured to detect on the first SCell whether an RS corresponding to a new candidate beam exists; and
an eighth transmitting submodule, configured to transmit, if the detection submodule detects the RS corresponding to the new candidate beam, a corresponding random access preamble on a random access time-frequency resource corresponding to the RS of the new candidate beam in a PRACH resource of the first SCell, to notify the base station that the first SCell of the UE has the beam failure, the PRACH on the first SCell being available.

Optionally, the transmitting module may include:
a second receiving submodule, configured to receive configuration signaling from the base station; and
a ninth transmitting submodule, configured to transmit a time-frequency code resource of the report message through a PUCCH/PUSCH/PRACH configured by the target serving cell based on the configuration signaling.

Optionally, the device may further include:
a receiving module, configured to receive configuration information for beam measurement and report of the first SCell from the base station; and
a beam measurement and report module, configured to perform the beam measurement based on the configuration information and report a candidate beam obtained by the measurement, the candidate beam being used by the base station for updating a beam configuration of the first SCell.

According to a third aspect of the embodiments of the present disclosure, a computer-readable storage medium is provided, in which a computer program is stored; and the program is executed by a processor to implement the operations of the method as described in the first aspect.

According to a fourth aspect of the embodiments of the present disclosure, UE is provided, which may include:
a memory, configured to store a computer program; and
a processor, configured to execute the computer program in the memory to implement the operations of the method as described in the first aspect.

The technical solutions provided by the present disclosure at least can achieve the following beneficial effects.

When any SCell of UE has a beam failure, a target serving cell for transmitting a report message to notify a base station that the SCell has the beam failure may be determined. The target serving cell may specifically be a serving cell of the UE other than the SCell. In this case, the UE may transmit, in a cross-carrier manner, the message for reporting that the SCell has the beam failure on the a serving cell, and may further take the SCell as the target serving cell to transmit the report message under the condition that a PUCCH/PUSCH/PRACH of the SCell is available. Therefore, it is ensured that when a SCell of UE has a beam failure, a base station can also be correctly notified.

Other features and advantages of the present disclosure will be elaborated below in detail in the detailed description.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

It is first to be noted that the sign "I" herein represents an "or" relationship. For example, "A/B" means A or B. For another example, "whether a PUCCH/PUSCH/PRACH of a first SCell is available" hereinafter should be understood as "whether a PUCCH or a PUSCH or a PRACH of a first SCell is available". When this sign appears in other parts below, the specific descriptions will not be elaborated.

The application scenario of the embodiments of the present disclosure is further described. The following embodiments of the present disclosure may be applied to wireless communication networks such as a 5G NR system, an LTE system and a Long Term Evolution Advanced (LTE-A) system, and further evolved networks thereof.

A wireless communication network may include a base station and UE. The base station may be a device communicating with the UE or another communication station such as a relay station. The base station may provide a communication coverage within a special physical region. For example, the base station may specifically be a gNB in a 5G NR system or an Evolved Node B (briefly referred to as an ENB or eNodeB) in an LTE system, or, may also be another access network device providing an access service in the wireless communication network.

In the embodiments of the present disclosure, UE may be distributed in the whole wireless communication network. Each UE may be static or mobile. For example, the UE may be a cellular phone, a personal digital assistant (PDA), a handheld device, a laptop computer and other wireless communication devices. The UE may also be a Machine to Machine (M2M) terminal applied to M2M communication, and may be, for example, a device supporting the M2M communication such as an intelligent electric meter and an intelligent household appliance. In addition, it is to be noted that, with the constant emergence of novel Internet applications such as new-generation Augmented Reality (AR) and Virtual Reality (VR) technologies and vehicle to vehicle communication, the scenario in which the wireless communication network is deployed is increasingly wide. Hence, the types of the UE may be more diverse, and there are no limits made thereto in the present disclosure.

Based on the above application scenario, a method for reporting a beam failure of a SCell provided by the embodiments of the present disclosure is described below.

Figure 1:
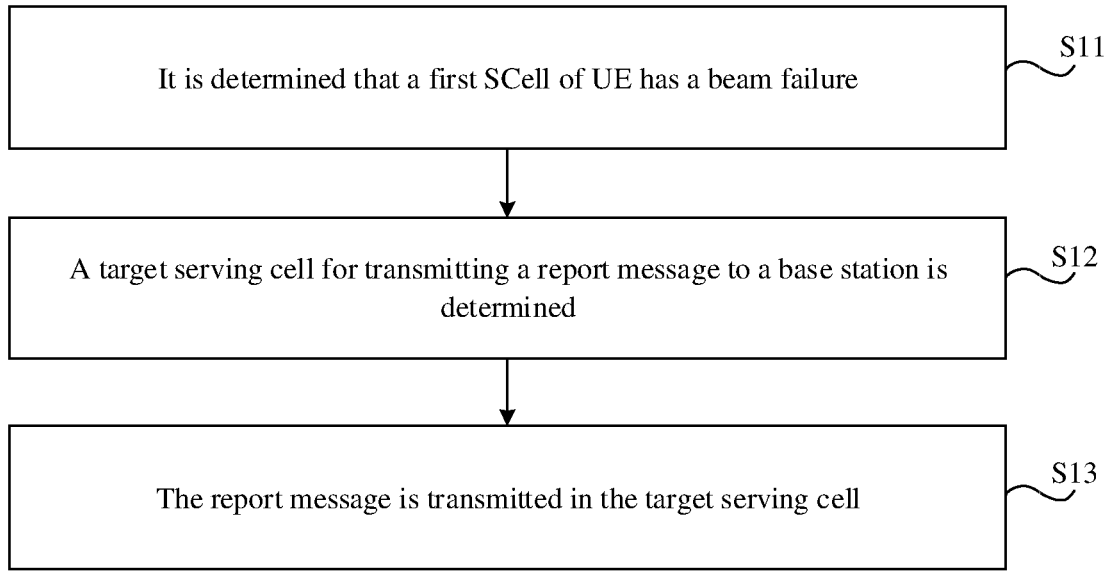
FIG. 1 is a flowchart showing a method for reporting a beam failure of a SCell according to an exemplary embodiment of the present disclosure.

FIG. 1 is a flowchart showing a method for reporting a beam failure of a SCell according to an exemplary embodiment of the present disclosure. The method is applied to UE. As shown in FIG. 1, the method may include the following operations.

In S11, it is determined that a first SCell of UE has a beam failure.

The first SCell may be any SCell of the UE.

In S12, a target serving cell for transmitting a report message to a base station is determined.

The report message is configured to notify the base station that the first SCell has the beam failure.

During specific implementation, in corresponding conditions, the target serving cell may be the first SCell, or may also be a serving cell of the UE other than the first SCell. Conditions in which each cell of the UE can be taken as the target serving cell will be described below in detail.

In S13, the report message is transmitted in the target serving cell.

Specifically, the UE may receive configuration signaling from the base station, and transmit a time-frequency code resource of the report message through a PUCCH/PUSCH/PRACH configured by the target serving cell based on the configuration signaling.

In addition, different target serving cells may be determined in operation S12, therefore, the report message may be transmitted in different ways for notifying the base station that the first SCell has the beam failure, which will be described below.

With the adoption of the operations of the method, when any SCell of UE has a beam failure, a target serving cell for transmitting a report message to notify the base station that the SCell has the beam failure may be determined; and the target serving cell may specifically be a serving cell of the UE other than the SCell. In this case, the UE may transmit, in a cross-carrier manner, the message for reporting that the SCell has the beam failure on the cell, and may further take the SCell as the target serving cell to transmit the report message under the condition that a PUCCH/PUSCH/PRACH of the SCell is available. Therefore, it is ensured that when the SCell of the UE has the beam failure, the base station can also be correctly notified.

Figure 2:
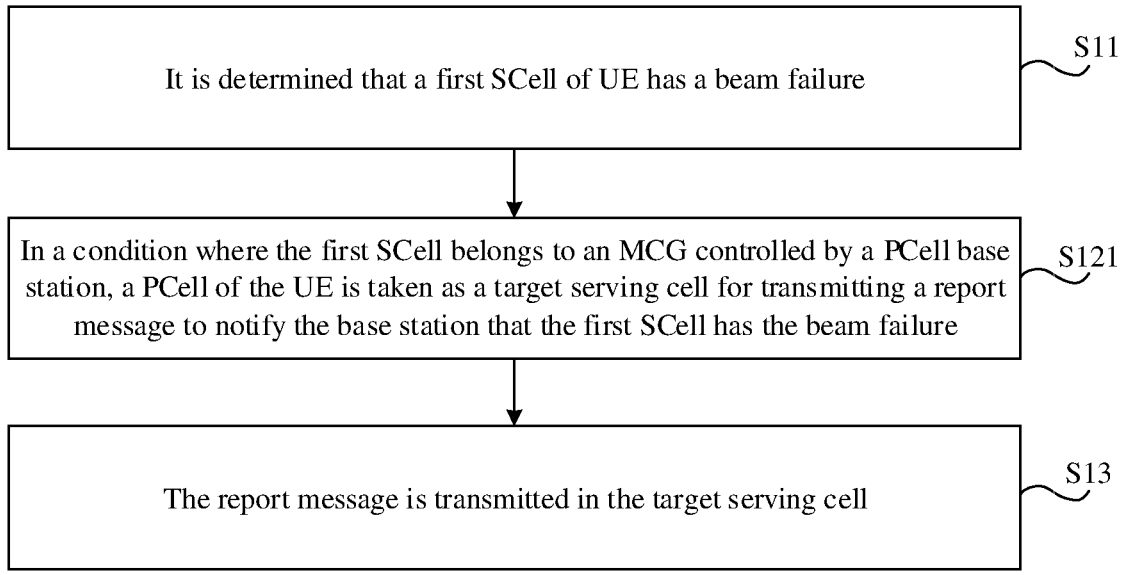
FIG. 2 is a flowchart showing another method for reporting a beam failure of a SCell according to an exemplary embodiment of the present disclosure.

The above operations will be described below in detail. FIG. 2 is a flowchart showing a method for reporting a beam failure of a SCell according to an exemplary embodiment of the present disclosure. As shown in FIG. 2, the method includes the following operations.

In S11, it is determined that a first SCell of UE has a beam failure.

In S121, in a condition where the first SCell belongs to an MCG controlled by a PCell base station, a PCell of the UE is taken as a target serving cell for transmitting a report message to notify the base station that the first SCell has the beam failure.

In S13, the report message is transmitted in the target serving cell.

That is, the operation S12 shown in FIG. 1 may specifically be operation S121: in a condition where the first SCell belongs to an MCG controlled by a PCell base station, a PCell of the UE is taken as a target serving cell for transmitting a report message to notify the base station that the first SCell has the beam failure.

FIG. 2 is merely a possible implementation manner of the embodiments of the present disclosure. During specific implementation, when the first SCell belongs to an SCG controlled by a SCell base station, a PScell of the UE may also be taken as the target serving cell for transmitting the report message to notify the base station that the first SCell has the beam failure. In addition, a serving cell, configured with a PUCCH/PUSCH/PRACH, of the UE may also be taken as the target serving cell for transmitting the report message.

To sum up, the operation S13 may include that: a PCell of the UE is taken as the target serving cell, the first SCell belonging to an MCG controlled by a PCell base station; or, a PSCell of the UE is taken as the target serving cell, the first SCell belonging to an SCG controlled by a SCell base station; or, a serving cell other than the first SCell, the PCell and the PSCell, of the UE, which is configured with a PUCCH/PUSCH/PRACH, is taken as the target serving cell. During specific implementation, the target serving cell of the UE for transmitting the report message to notify the beam failure may be pre-configured. In this way, the UE may directly determine the target serving cell based on the configuration after determining that any SCell has the beam failure.

Descriptions will be made on how to specifically transmit the report message in the condition where a serving cell of the UE other than the first SCell is taken as the target serving cell.

First manner the report message is carried by a sequential value for transmitting L1-RSRP of a PUCCH/PUSCH of the target serving cell, the report message including a cell identifier of the first SCell and indication information for indicating that the beam failure occurs.

Optionally, the indication information may include identifier(s) of one or more RSs of the first SCell and L1-RSRP of the one or more RSs, and indicate that the beam failure occurs when bit value(s) of the L1-RSRP of the RS(s), for detecting the beam failure, of the first SCell is/are all preset bit values. That is, upon the reception of the report message, the base station may determine that the serving cell of the UE has the beam failure based on the indication information, and determine that the first SCell has the beam failure based on the serving cell identifier.

It is to be noted that, in conventional art, an L1-RSRP absolute value of a beam having a strongest L1-RSRP among multiple beams is indicated by 7 bit; and L1-RSRP values of other beams are indicated by a relative value of the strongest L1-RSRP, the relative value of each beam being indicated by 4 bit. The above first manner is to multiplex L1-RSRP. A beam failure may be represented by a sequential value of bit for transmitting the L1-RSRP. For example, in order to indicate a beam failure of a beam, a sequential value in 4 bit, such as 0000, may be set to represent the beam failure of the beam when the beam is not a beam with the strongest L1-RSRP. When the beam is the beam with the strongest L1-RSRP, a sequential value in 7 bit, such as 0000000, may be set to represent the beam failure of the beam.

Second manner the report message is carried by a sequential value for feeding back a CQI on a PUCCH/PUSCH of the target serving cell, the report message including a cell identifier of the first SCell and channel quality information of the first SCell, and indicating that the beam failure occurs when the first SCell has channel quality less than a preset threshold.

Exemplarily, the channel quality information may include a CQI value of an RS of the first SCell for detecting the beam failure. In this way, the embodiment of the present disclosure may be designed as that when CQI values of the RSs of the first SCell for detecting the beam failure are all less than the preset threshold, it is considered that the first SCell has the beam failure. The condition for determining that the serving cell has the beam failure may be agreed between the UE and the base station in advance.

Third manner the report message is carried by a resource for an SR on a PUCCH/PUSCH of the target serving cell, the report message including a cell identifier of the first SCell and indication information for indicating that the beam failure occurs.

That is, the SR resource may be multiplexed to design corresponding indication information, and both the indication information and the serving cell identifier may be taken as the report message to be transmitted to the base station, thereby notifying the base station that the first SCell has the beam failure. the method for multiplexing L1-RSRP in the first manner may be applied to the indication information to indicate the beam failure with a special bit value, which will not be elaborated herein.

Fourth manner a report message of a predefined format is transmitted on a PUCCH/PUSCH of the target serving cell, the predefined format specifying a bit for carrying the report message on the PUCCH/PUSCH, a bit value representing a cell identifier of the first SCell, and a bit value representing indication information for indicating that the beam failure occurs.

That is, both the first manner and the third manner multiplex the existing transmission resource. In the embodiment of the present disclosure, a message format dedicated to indicate the beam failure may also be designed to transmit the report message of the predefined format on the PUCCH/PUSCH.

Fifth manner a preset PRACH time-frequency code resource is received from the base station, the preset PRACH time-frequency resource being configured to transmit report information that the first SCell has the beam failure; and a preset random access preamble is transmitted on the preset PRACH time-frequency resource, to notify the base station that the first SCell of the UE has the beam failure.

That is, for the target serving cell configured with the PRACH, a contention free random access preamble (i.e., the above preset random access preamble) may be used as the report message, and the random access preamble may be transmitted on the preset PRACH time-frequency resource, the preset PRACH time-frequency resource being a resource that is allocated by the base station to the UE and specifically transmits the report message for notifying the base station that the first SCell has the beam failure. In this way, as long as the base station receives the preset random access preamble on the preset PRACH time-frequency resource, it may be considered that the first SCell has the beam failure.

In another possible implementation manner, the UE may further use the contention based random access preamble of the first SCell as the report message, and transmit the contention based random access preamble on the PRACH time-frequency resource of the target serving cell, to notify the base station that the first SCell of the UE has the beam failure.

Figure 3:
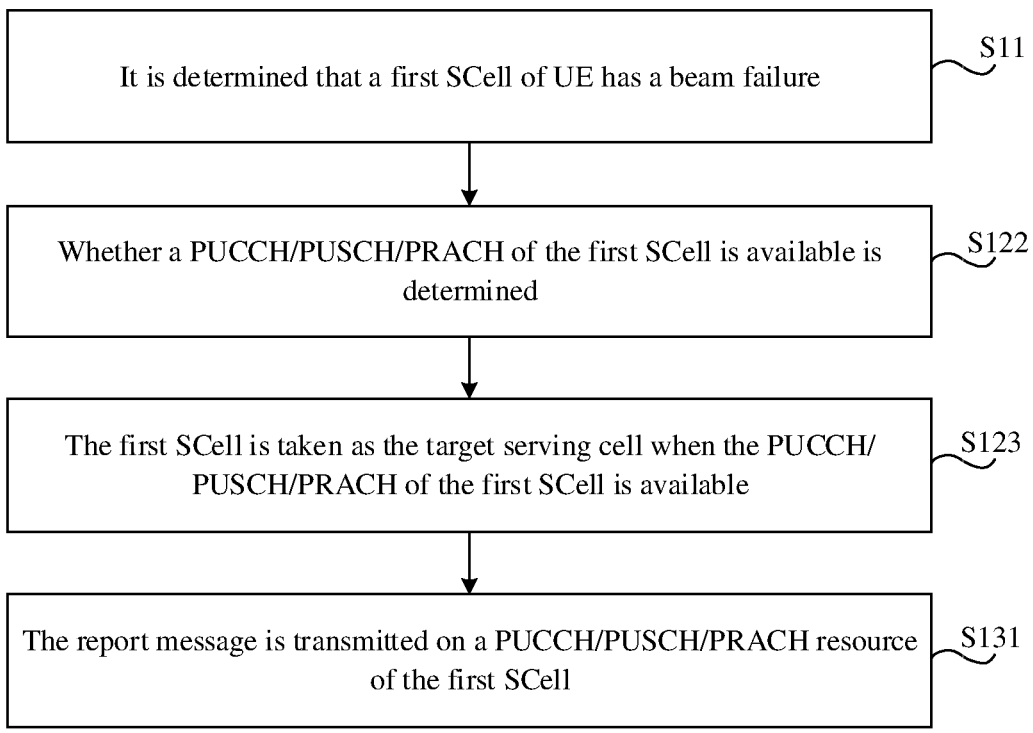
FIG. 3 is a flowchart showing another method for reporting a beam failure of a SCell according to an exemplary embodiment of the present disclosure.

Optionally, besides a serving cell of the UE other than the first SCell may be taken as the target serving cell, in the embodiment of the present disclosure, in a condition where a PUCCH/PUSCH/PRACH of the first SCell is available, the first SCell may be determined as the target serving cell, and the report message may be transmitted on the PUCCH/PUSCH/PRACH of the first SCell. Exemplarily, FIG. 3 is a flowchart showing a method for reporting a beam failure of a SCell according to an exemplary embodiment of the present disclosure. As shown in FIG. 3, the method may include the following operations.

In S11, it is determined that a first SCell of UE has a beam failure.

In S122, whether a PUCCH/PUSCH/PRACH of the first SCell is available is determined.

Exemplarily, whether the PUCCH/PUSCH/PRACH of the first SCell is available may be determined in the following two manners.

First manner an indication message is received from the base station, and whether the PUCCH/PUSCH/PRACH of the first SCell is available is determined based on the indication message.

Specifically, upon determination of a downlink reception failure of the UE in the first SCell, the base station may determine whether uplink information transmitted by the UE on the PUCCH/PUSCH/PRACH of the first SCell can be received; and if yes, it is indicated that the PUCCH/PUSCH/PRACH of the first SCell is available. In this case, the base station may transmit the indication information through a PDCCH or PDSCH in a serving cell to notify the UE that the PUCCH/PUSCH/PRACH of the first SCell is available. Hence, upon reception of the indication message from the base station, the UE may determine that the PUCCH/PUSCH/PRACH of the first SCell is available.

Second manner whether reception and transmission of the UE have reciprocity is determined, and it is determined that the PUCCH/PUSCH/PRACH of the first SCell is available when the reception and transmission of the UE do not have the reciprocity.

It is to be noted that, the reciprocity refers to that parameters of an antenna used as an information transmitting antenna and parameters of an antenna used as an information receiving antenna keep unchanged. If the reception and transmission of the UE have the reciprocity, the UE is more likely to have an uplink failure in case of a downlink failure; and if the reception and transmission of the UE do not have reciprocity, it may be considered that the uplink PUCCH/PUSCH/PRACH of the UE is still available in case of the downlink failure.

In S123, the first SCell is taken as the target serving cell when the PUCCH/PUSCH/PRACH of the first SCell is available.

In S131, the report message is transmitted on a PUCCH/PUSCH/PRACH resource of the first SCell.

That is, the operation S12 shown in FIG. 1 may include that whether a PUCCH/PUSCH/PRACH of the first SCell is available is determined; and the first SCell is taken as the target serving cell when the PUCCH/PUSCH/PRACH of the first SCell is available. Meanwhile, the operation S13 may include that the report message is transmitted on a PUCCH/PUSCH/PRACH resource of the first SCell.

Descriptions will be made on how to specifically transmit the report message in the condition where the first SCell is taken as the target serving cell.

First manner in the condition where the PUCCH/PUSCH on the first SCell is available, the report message is carried by a sequential value for transmitting L1-RSRP of the PUCCH/PUSCH of the first SCell, the PUCCH/PUSCH on the first SCell being available.

Optionally, the report message may include identifier(s) of one or more RSs of the first SCell and L1-RSRP of the one or more RSs, and indicate that the first SCell has the beam failure when bit value(s) of the L1-RSRP of the RS(s), for detecting the beam failure, of the first SCell are all preset bit values.

Second manner in the condition where the PUCCH/PUSCH on the first SCell is available, the report message is carried by a sequential value for feeding back a CQI on the PUCCH/PUSCH of the first SCell, the report message including channel quality information of the first SCell, and indicating that the first SCell has the beam failure when the first SCell has channel quality less than a preset threshold, the PUCCH/PUSCH on the first SCell being available.

Exemplarily, the channel quality information may include a CQI value of an RS of the first SCell for detecting the beam failure. In this way, the embodiment of the present disclosure may be designed as that when CQI values of RSs of the first SCell for detecting the beam failure are all less than the preset threshold, it may be considered that the first SCell has the beam failure. The condition for determining that a serving cell has a beam failure may be agreed between the UE and the base station in advance.

Figure 4:
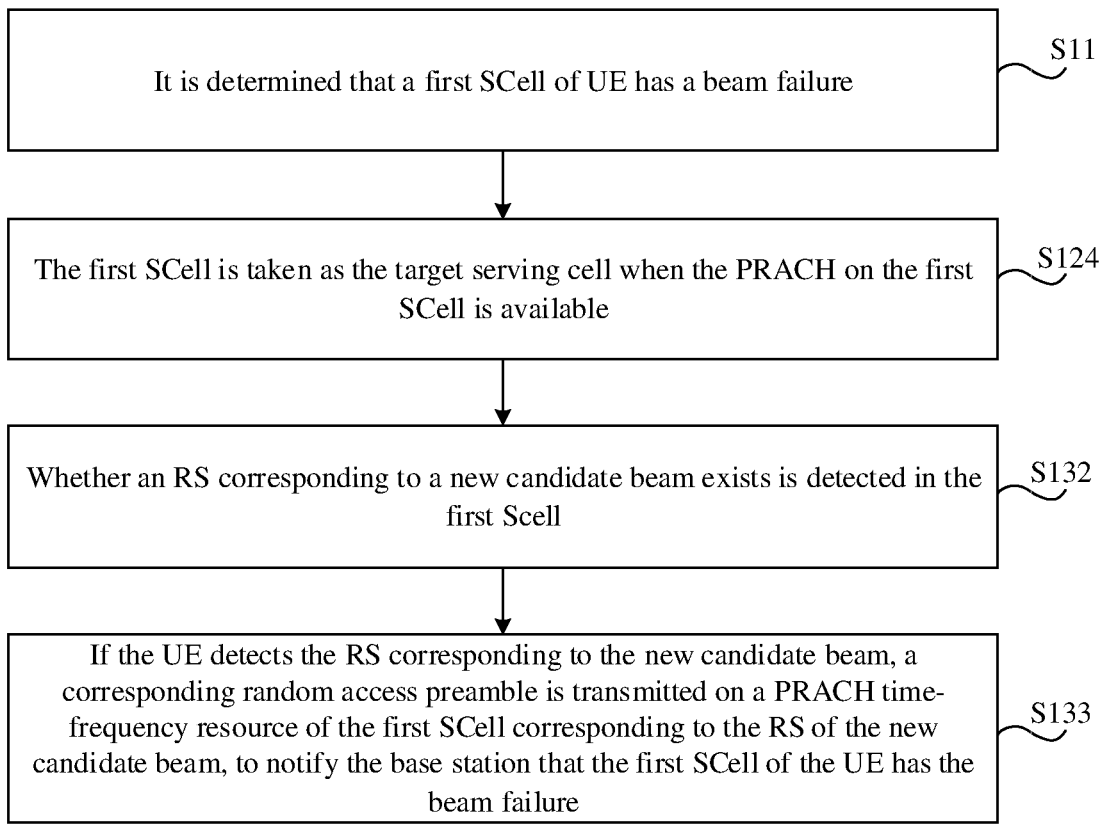
FIG. 4 is a flowchart showing another method for reporting a beam failure of a SCell according to an exemplary embodiment of the present disclosure.

FIG. 4 is a flowchart showing a method for reporting a beam failure of a SCell according to an exemplary embodiment of the present disclosure. As shown in FIG. 4, the method may include the following operations.

In S11, it is determined that a first SCell of UE has a beam failure.

In S124, the first SCell is taken as the target serving cell when the PRACH on the first SCell is available.

In S132, whether an RS corresponding to a new candidate beam exists is detected in the first SCell.

In S133, if the UE detects the RS corresponding to the new candidate beam, a corresponding random access preamble is transmitted on a PRACH time-frequency resource of the first SCell corresponding to the RS of the new candidate beam, to notify the base station that the first SCell of the UE has the beam failure.

That is, in the condition where the PRACH on the first SCell of the UE is available and the UE detects the RS corresponding to the new candidate beam, the UE may transmit the random access preamble corresponding to the RS on the random access time-frequency resource corresponding to the RS, to implicitly notify the base station that the UE has the beam failure in the first SCell and finds a new beam (i.e., the beam used by the RS corresponding to the random access time-frequency code resource), such that the base station may perform beam recovery on the first SCell with the new beam.

Figure 5:
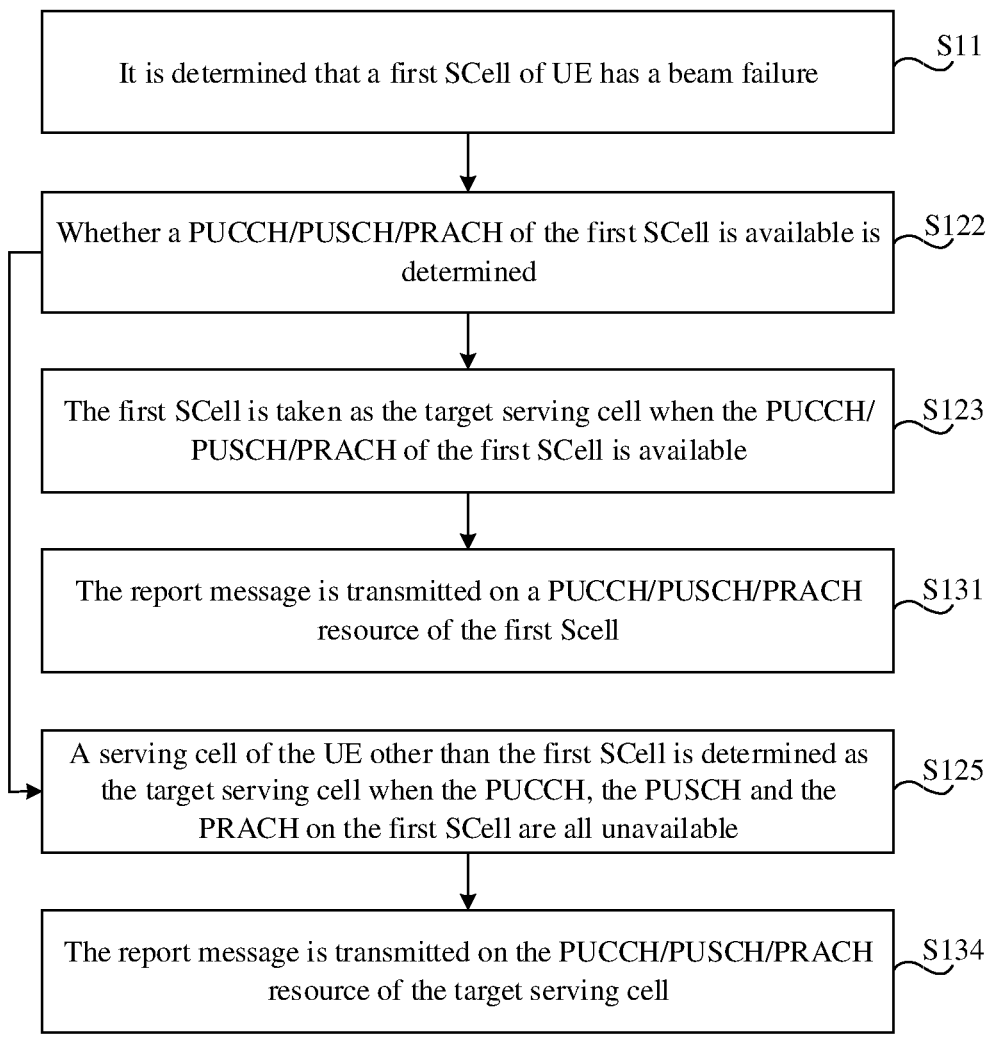
FIG. 5 is a flowchart showing another method for reporting a beam failure of a SCell according to an exemplary embodiment of the present disclosure.

FIG. 5 is a flowchart showing a method for reporting a beam failure of a SCell according to an exemplary embodiment of the present disclosure. As shown in FIG. 5, the method may include the following operations.

In S11, it is determined that a first SCell of UE has a beam failure.

In S122, whether a PUCCH/PUSCH/PRACH of the first SCell is available is determined.

When the PUCCH/PUSCH/PRACH of the first SCell is available, the operation S123 and operation S131 are executed; and if the PUCCH, the PUSCH and the PRACH on the first SCell are all unavailable, operation S125 and operation 134 are executed.

In S123, the first SCell is taken as the target serving cell when the PUCCH/PUSCH/PRACH of the first SCell is available.

In S131, the report message is transmitted on a PUCCH/PUSCH/PRACH resource of the first SCell.

In S125, a serving cell of the UE other than the first SCell is determined as the target serving cell when the PUCCH, the PUSCH and the PRACH on the first SCell are all unavailable.

In S134, the report message is transmitted on the PUCCH/PUSCH/PRACH resource of the target serving cell.

The technical solutions shown in FIG. 5 are an embodiment obtained in combination with FIG. 2 and FIG. 3, and each operation may refer to corresponding descriptions in FIG. 2 and FIG. 3 and will not be elaborated herein.

With the technical solutions shown in FIG. 5, when any SCell of UE has a beam failure, a SCell may be used as a target serving cell to transmit a report message when a PUCCH/PUSCH/PRACH of the SCell is available. When the PUCCH/PUSCH/PRACH of the SCell is unavailable, a serving cell of the UE other than the SCell may be determined as the target serving cell to transmit the report message in a cross-carrier manner. Therefore, it is ensured that when a SCell of UE has a beam failure, a base station can also be correctly notified.

Further, after the UE transmits the report message to the base station, the method may further include the following operations to perform beam recovery on the first SCell: configuration information for beam measurement and report of the first SCell is received from the base station; and the beam measurement is performed based on the configuration information and a candidate beam obtained by the measurement is reported, the candidate beam being used by the base station for updating a beam configuration of the first SCell. That is, the base station may obtain updated beam information by indicating the UE to perform the beam measurement and report, and allocate the updated beam information to the UE, thereby completing the beam recovery of the first SCell.

Figure 6:
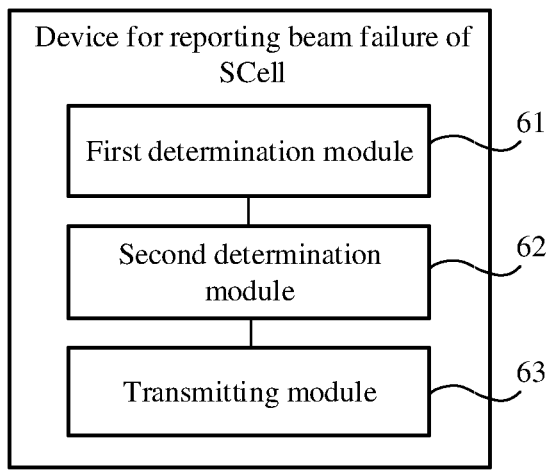
FIG. 6 is a block diagram showing a device for reporting a beam failure of a SCell according to an exemplary embodiment of the present disclosure.

The embodiments of the present disclosure further provide a device for reporting a beam failure of a SCell, which is configured to implement the operations of the method for reporting the beam failure of the SCell provided in the method embodiment. The device may implement the part of the UE via hardware, software or a combination thereof. As shown in FIG. 6, the device may include:

a first determination module 61, configured to determine that a first SCell has a beam failure;

a second determination module 62, configured to determine a target serving cell for transmitting a report message to a base station, the report message being configured to notify the base station that the first SCell has the beam failure; and a transmitting module 63 is configured to transmit the report message in the target serving cell.

With the adoption of the above device, when any SCell of UE has a beam failure, a target serving cell for transmitting a report message to notify the base station that a SCell has the beam failure may be determined. The target serving cell may specifically be a serving cell of the UE other than the SCell. In this case, the UE may transmit, in a cross-carrier manner, a message for reporting that the SCell has the beam failure in the serving cell, and may further take the SCell as the target serving cell to transmit the report message under the condition that a PUCCH/PUSCH/PRACH of the SCell is available. Therefore, it is ensured that when the SCell of the UE has the beam failure, the base station can also be correctly notified.

Figure 7:
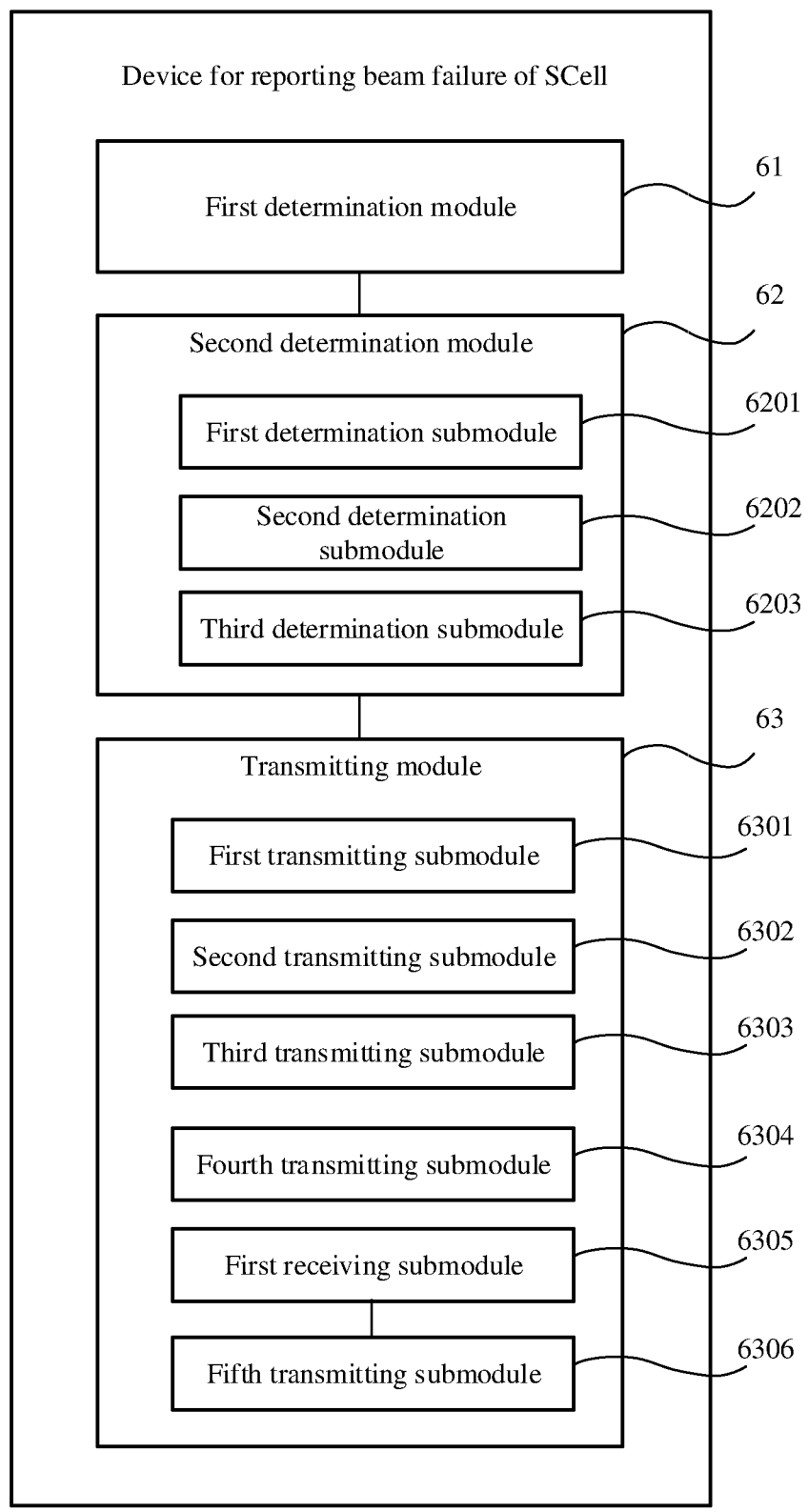
FIG. 7 is a block diagram showing another device for reporting a beam failure of a SCell according to an exemplary embodiment of the present disclosure.

Optionally, as shown in FIG. 7, the second determination module 62 may include:

a first determination submodule 6201, configured to take a PCell of UE as the target serving cell, the first SCell belonging to an MCG controlled by a PCell base station; or, a second determination submodule 6202, configured to take a PSCell of the UE as the target serving cell, the first SCell belonging to an SCG controlled by a SCell base station; or, a third determination submodule 6203 is configured to take a serving cell of the UE other than the first SCell, the PCell and the PSCell, which is configured with a PUCCH/PUSCH/PRACH, as the target serving cell.

Figure 8:
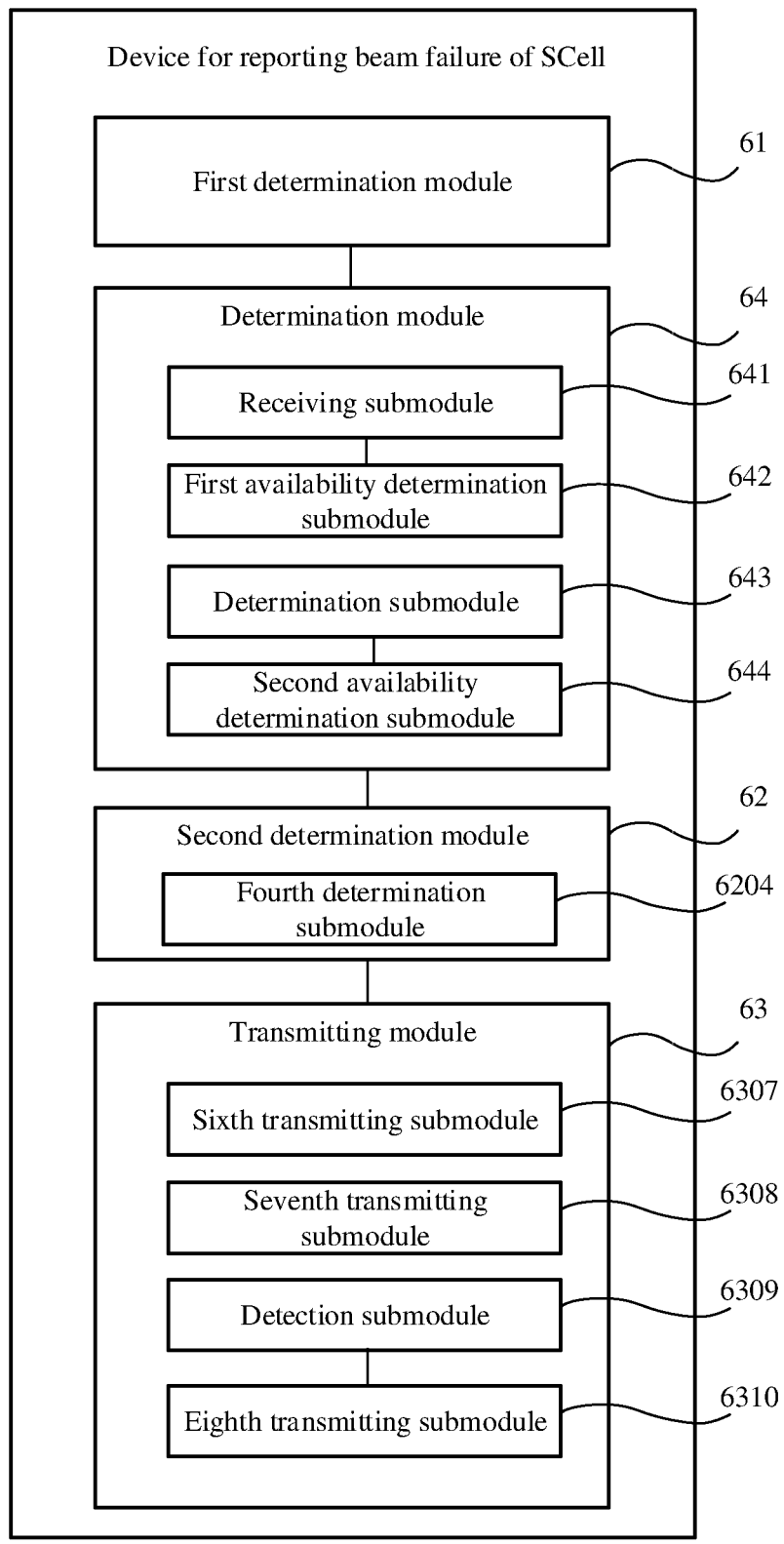
FIG. 8 is a block diagram showing another device for reporting a beam failure of a SCell according to an exemplary embodiment of the present disclosure.

Optionally, as shown in FIG. 8, the second determination module 62 may include a fourth determination submodule 6204 configured to determine the first SCell as the target serving cell; and the transmitting module is configured to transmit the report message on a PUCCH/PUSCH/PRACH resource of the first SCell.

Optionally, as shown in FIG. 8, the device may further include: a determination module 64 configured to determine whether the PUCCH/PUSCH/PRACH of the first SCell is available.

The fourth determination submodule 6204 is configured to take the first SCell as the target serving cell when the PUCCH/PUSCH/PRACH of the first SCell is available.

Optionally, the determination module 64 may include: a receiving submodule 641 configured to receive an indication message from the base station; and a first availability determination submodule 642 configured to determine whether the PUCCH/PUSCH/PRACH of the first SCell is available based on the indication message; or, the determination module 64 may include: a determination submodule 643 configured to determine whether reception and transmission of the UE have reciprocity; and a second availability determination submodule 644 configured to determine that the PUCCH/PUSCH/PRACH of the first SCell is available when the reception and transmission of the UE do not have the reciprocity.

Optionally, as shown in FIG. 7, the transmitting module 63 may include a first transmitting submodule 6301, configured to:

carry the report message by a sequential value for transmitting L1-RSRP of a PUCCH/PUSCH of the target serving cell, the report message including a cell identifier of the first SCell and indication information for indicating that the beam failure occurs.

Optionally, the indication information may include identifier(s) of one or more RSs of the first SCell and L1-RSRP of the one or more RSs, and indicate that the beam failure occurs when bit value(s) of the L1-RSRP of the one or more RSs are all preset bit values.

Optionally, as shown in FIG. 7, the transmitting module 63 may include a second transmitting submodule 6302, configured to:

carry the report message by a sequential value for feeding back a CQI on a PUCCH/PUSCH of the target serving cell, the report message including a cell identifier of the first SCell and channel quality information of the first SCell, and indicating that the beam failure occurs when the first SCell has channel quality less than a preset threshold.

Optionally, as shown in FIG. 7, the transmitting module 63 may include a third transmitting submodule 6303, configured to:

carry the report message by a resource for an SR on a PUCCH/PUSCH of the target serving cell, the report message including a cell identifier of the first SCell and indication information for indicating that the beam failure occurs.

Optionally, as shown in FIG. 7, the transmitting module 63 may include a fourth transmitting submodule 6304, configured to:

transmit a report message of a predefined format on a PUCCH/PUSCH of the target serving cell, the predefined format specifying a bit for carrying the report message on the PUCCH/PUSCH, a bit value representing a cell identifier of the first SCell, and a bit value representing indication information for indicating that the beam failure occurs.

Optionally, as shown in FIG. 7, the transmitting module 63 may include:

a first receiving submodule 6305, configured to receive a preset PRACH time-frequency code resource from the base station, the preset PRACH time-frequency resource being configured to transmit report information that the first SCell has the beam failure; and a fifth transmitting submodule 6306, configured to transmit a preset random access preamble on the preset PRACH time-frequency resource, to notify the base station that the first SCell of the UE has the beam failure.

Optionally, as shown in FIG. 8, the transmitting module 63 may include a sixth transmitting submodule 6307, configured to:

carry the report message by a sequential value for transmitting L1-RSRP of the PUCCH/PUSCH of the first SCell, the PUCCH/PUSCH on the first SCell being available.

Optionally, the report message may include identifier(s) of one or more RSs of the first SCell and L1-RSRP of the one or more RSs, and indicate that the first SCell has the beam failure when bit value(s) of the L1-RSRP of the one or more RSs are all preset bit values.

Optionally, as shown in FIG. 8, the transmitting module 63 may include a seventh transmitting submodule 6308, configured to:

carry the report message by a sequential value for feeding back a CQI on the PUCCH/PUSCH of the first SCell, the report message including channel quality information of the first SCell and indicating that the first SCell has the beam failure when the first SCell has channel quality less than a preset threshold, the PUCCH/PUSCH on the first SCell being available.

Optionally, as shown in FIG. 8, the transmitting module 63 may include:

a detection submodule 6309, configured to detect whether an RS corresponding to a new candidate beam exists on the first SCell; and an eighth transmitting submodule 6310, configured to transmit, if the detection submodule detects the RS corresponding to the new candidate beam, a corresponding random access preamble on a random access time-frequency resource corresponding to the RS of the new candidate beam in a PRACH resource of the first SCell, to notify the base station that the first SCell of the UE has the beam failure, the PRACH on the first SCell being available.

Figure 9:
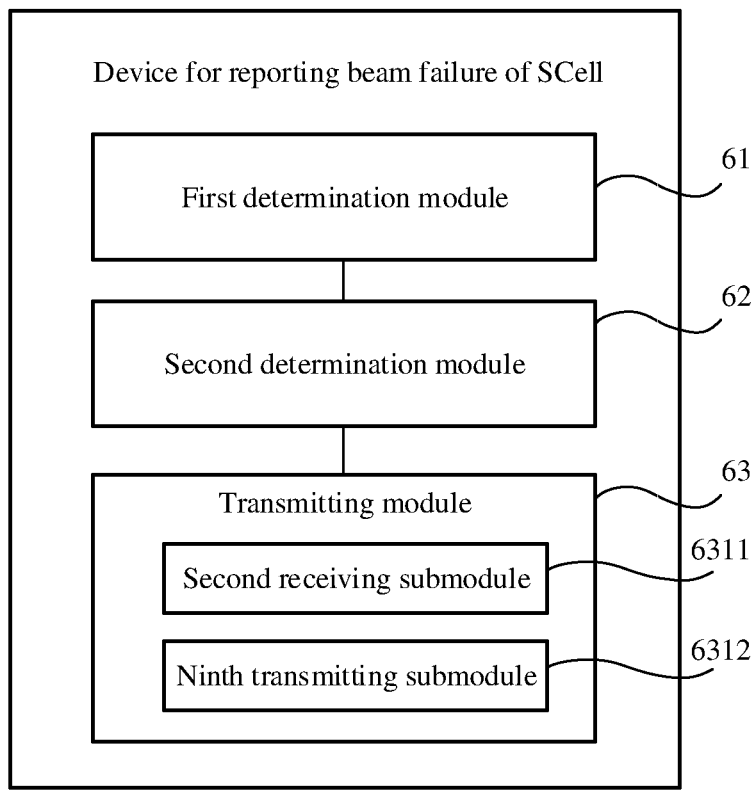
FIG. 9 is a block diagram showing another device for reporting a beam failure of a SCell according to an exemplary embodiment of the present disclosure.

Optionally, as shown in FIG. 9, the transmitting module 63 may include:

a second receiving submodule 6311, is configured to receive configuration signaling from the base station; and a ninth transmitting submodule 6312, configured to transmit a time-frequency code resource of the report message through a PUCCH/PUSCH/PRACH configured by the target serving cell based on the configuration signaling.

Figure 10:
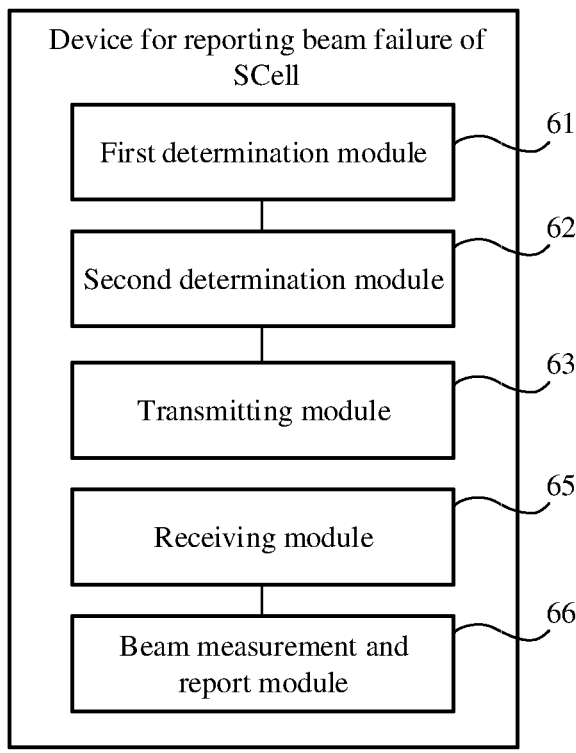
FIG. 10 is a block diagram showing another device for reporting a beam failure of a SCell according to an exemplary embodiment of the present disclosure.

Optionally, as shown in FIG. 10, the device may further include: a receiving module 65 and a beam measurement and report module 66.

The receiving module 65 is configured to receive configuration information for beam measurement and report of the first SCell from the base station.

The beam measurement and report module 66 is configured to perform the beam measurement based on the configuration information and report a candidate beam obtained by the measurement. The candidate beam is used by the base station for updating a beam configuration of the first SCell.

The person skilled in the art should know that the above is merely schematic for the device for reporting the beam failure of the SCell with FIG. 6 to FIG. 10. During specific implementation, the above modules may have other combinations or variations according to functional requirements. For the device in the above embodiments, the specific manner for the operation executed by each module has been described in detail in the embodiments related to the method, and is not elaborated herein.

The embodiments of the present disclosure further provide a computer-readable storage medium, in which a computer program is stored; and the program is executed by a processor to implement the operations of the method for reporting the beam failure of the SCell provided by the method embodiment.

The embodiments of the present disclosure further provide UE, which may include: a memory, in which a computer program is stored; and a processor, configured to execute the computer program in the memory to implement the operations of the method for reporting the beam failure of the SCell provided by the method embodiment.

Figure 11:
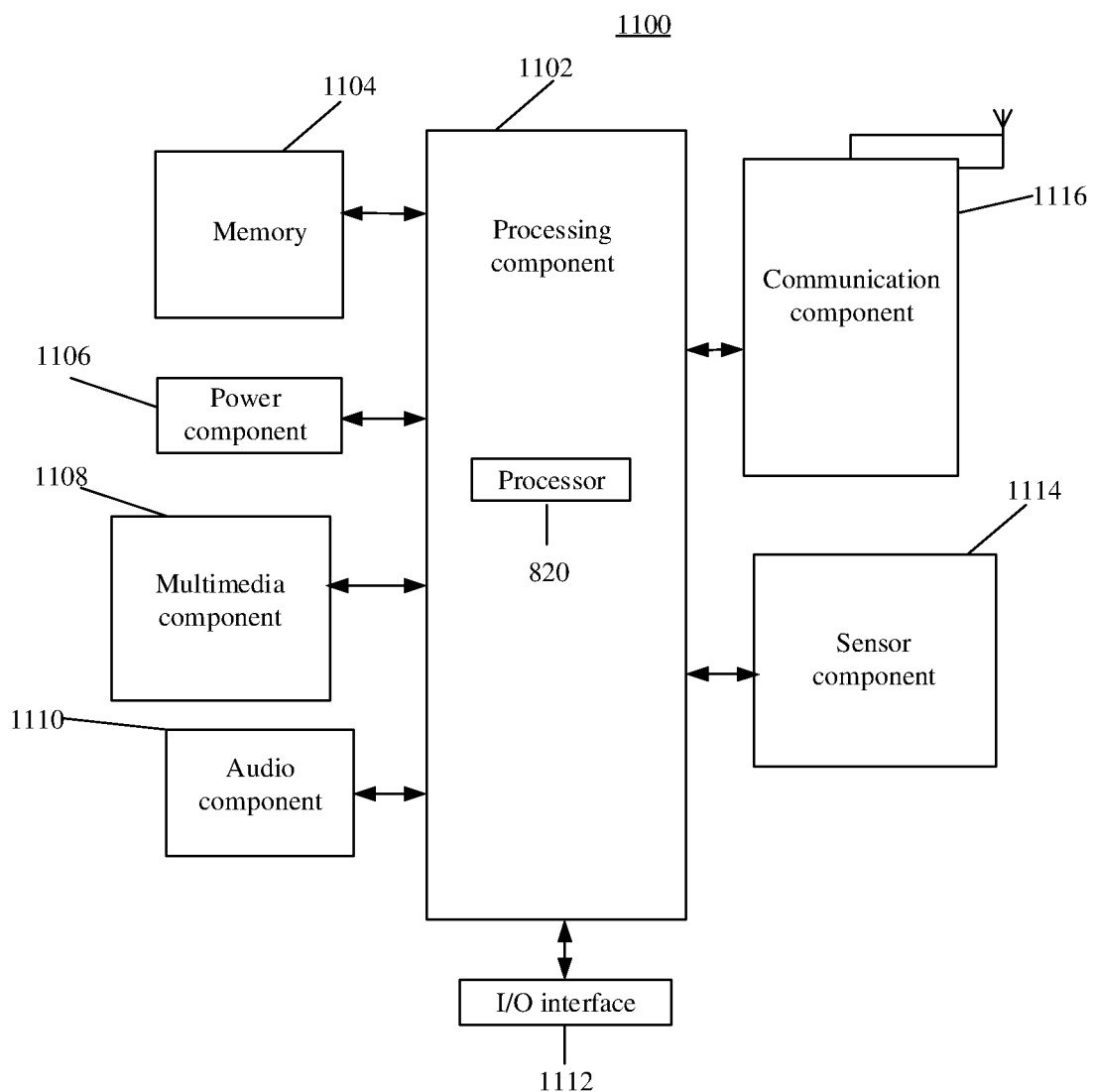
FIG. 11 is a block diagram showing a UE according to an exemplary embodiment of the present disclosure.

Exemplarily, FIG. 11 is a block diagram showing a UE according to an exemplary embodiment of the present disclosure. For example, the UE 1100 may be a terminal such as a mobile phone, a computer, a digital broadcast terminal, a messaging device, a gaming console, a tablet, a medical device, exercise equipment and a PDA.

Referring to FIG. 11, the UE 1100 may include one or more of the following components: a processing component 1102, a memory 1104, a power component 1106, a multimedia component 1108, an audio component 1110, an Input/Output (I/O) interface 1112, a sensor component 1114, and a communication component 1116.

The processing component 1102 typically controls overall operations of the UE 1100, such as the operations associated with display, telephone calls, data communications, camera operations, and recording operations. The processing component 1102 may include one or more processors 1120 to execute instructions to perform all or part of the operations in the uplink feedback method at the terminal side. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the UE 1100. Examples of such data include instructions for any application or method operated on the UE 1100, contact data, phonebook data, messages, pictures, videos, etc. The memory 1104 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 1106 provides power to various components of the UE 1100. The power component 1106 may include a power management system, one or more power sources, and any other components associated with the generation, management, and distribution of power in the UE 1100.

The multimedia component 1108 includes a screen providing an output interface between the UE 1100 and the user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 1108 includes a front camera and/or a rear camera. The front camera and/or the rear camera may receive external multimedia data when the UE 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a Microphone (MIC) configured to receive an external audio signal when the UE 1100 is in an operation mode, such as a call mode, a recording mode, and a voice recognition mode. The received audio signal may further be stored in the memory 1104 or transmitted via the communication component 1116. In some embodiments, the audio component 1110 further includes a speaker configured to output audio signals.

The I/O interface 1112 provides an interface between the processing component 1102 and peripheral interface modules. The peripheral interface modules may be a keyboard, a click wheel, buttons, and the like. The buttons may include, but are not limited to, a home button, a volume button, a starting button, and a locking button.

The sensor component 1114 includes one or more sensors to provide status assessments of various aspects of the UE 1100. For instance, the sensor component 1114 may detect an on/off status of the UE 1100 and relative positioning of components, such as a display and small keyboard of the UE 1100, and the sensor component 1114 may further detect a change in a position of the UE 1100 or a component of the UE 1100, presence or absence of contact between the user and the UE 1100, orientation or acceleration/deceleration of the UE 1100 and a change in temperature of the UE 1100. The sensor component 1114 may include a proximity sensor, configured to detect the presence of nearby objects without any physical contact. The sensor component 1114 may also include a light sensor, such as a Complementary Metal Oxide Semiconductor (CMOS) or Charge Coupled Device (CCD) image sensor, configured for use in an imaging application. In some embodiments, the sensor component 1114 may also include an accelerometer sensor, a gyroscope sensor, a magnetic sensor, a pressure sensor, or a temperature sensor.

The communication component 1116 is configured to facilitate wired or wireless communication between the UE 1100 and another device. The UE 1100 may access a communication-standard-based wireless network, such as a Wireless Fidelity (WiFi) network, a 2nd-Generation (2G) or 3rd-Generation (3G) network or a combination thereof. In one exemplary embodiment, the communication component 1116 receives a broadcast signal or broadcast associated information from an external broadcast management system via a broadcast channel In one exemplary embodiment, the communication component 1116 further includes a near field communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

Exemplarily, the UE 1100 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the operations of the method for reporting the beam failure of the SCell provided by the method embodiment.

In an exemplary embodiment, a non-temporary computer readable storage medium including an instruction is further provided, for example, the memory 1104 including the instruction; and the instruction may be executed by the processing component 1120 of the UE 1100 to complete the operations of the method for reporting the beam failure of the SCell provided by the method embodiment. For example, the non-transitory computer-readable storage medium may be a Read Only Memory (ROM), a Random Access Memory (RAM), a Compact Disc Read-Only Memory (CD-ROM), a magnetic tape, a floppy disc, an optical data storage device and the like.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

Preferred embodiments of the present disclosure have been described above in detail in combination with the accompanying drawings. However, the present disclosure is not limited to the specific details in the above embodiments. Within the scope of technical concepts of the present disclosure, multiple simple variations may be made to the technical solutions of the present disclosure, and these simple variations all belong to the scope of protection of the present disclosure.

In addition, it is to be noted that the specific technical features described in the above detailed description may be combined in any appropriate manner without a conflict. Any possible combined manner will no longer be elaborated additionally for the fear of unnecessary repetition.

Furthermore, various different embodiments of the present disclosure may also be combined freely without departing from the concepts of the present disclosure, and shall be likewise considered as the contents disclosed by the present disclosure.

What is claimed is:

1. A method for reporting a beam failure of a secondary cell (SCell), the method being performed by user equipment (UE) and comprising:
   determining that a first SCell has a beam failure;
   determining a target serving cell for transmitting a report message to a base station, the report message being configured to notify the base station that the first SCell has the beam failure; and
   transmitting the report message in the target serving cell,
   wherein determining the target serving cell for transmitting the report message to the base station comprises:
   taking a primary secondary cell (PSCell) of the UE as the target serving cell for transmitting the report message to the base station, the first SCell belonging to a secondary cell group (SCG) controlled by a SCell base station,
   wherein transmitting the report message in the target serving cell comprises:
   carrying the report message by a resource for a scheduling request (SR) on a Physical Uplink Control Channel (PUCCH) of the target serving cell, the report message comprising a cell identifier of the first SCell and indication information for indicating that the beam failure occurs.

2. The method of claim 1, wherein transmitting the report message in the target serving cell further comprises:
   carrying the report message by a sequential value for transmitting L1-Reference Signal Received Power (L1-RSRP) on at least one of the PUCCH or a Physical Uplink Shared Channel (PUSCH) of the target serving cell.

3. The method of claim 2, wherein the indication information comprises an identifier of at least one reference signal of the first SCell and L1-RSRP of the at least one reference signal, and indicates that the beam failure occurs when each bit value of the L1-RSRP of the at least one reference signal is a preset bit value.

4. The method of claim 1, wherein transmitting the report message in the target serving cell further comprises:
   carrying the report message by a sequential value for feeding back a channel quality indicator (CQI) on at least one of the PUCCH or a Physical Uplink Shared Channel (PUSCH) of the target serving cell, the report message comprising channel quality information of the first SCell, and indicating that the beam failure occurs when the first SCell has channel quality less than a preset threshold.

5. The method of claim 1, wherein transmitting the report message in the target serving cell further comprises:
   transmitting a report message of a predefined format on at least one of the PUCCH or a Physical Uplink Shared Channel (PUSCH) of the target serving cell, the predefined format specifying a bit for carrying the report message on the at least one of the PUCCH or the PUSCH, a bit value representing a cell identifier of the first SCell, and a bit value representing indication information for indicating that the beam failure occurs.

6. The method of claim 1, wherein transmitting the report message in the target serving cell further comprises:
   receiving a preset Physical Random Access Channel (PRACH) time-frequency code resource from the base station, the preset PRACH time-frequency resource being configured to transmit report information that the first SCell has the beam failure; and
   transmitting a preset random access preamble on the preset PRACH time-frequency resource, to notify the base station that the first SCell of the UE has the beam failure.

7. The method of claim 1, wherein transmitting the report message in the target serving cell further comprises:
   receiving configuration signaling from the base station; and
   transmitting a time-frequency code resource of the report message through at least one of a PUCCH, a Physical Uplink Shared Channel (PUCCH), or a Physical Random Access Channel (PRACH) configured by the target serving cell based on the configuration signaling.

8. The method of claim 1, further comprising:
   receiving configuration information for beam measurement and report of the first SCell from the base station; and
   performing the beam measurement based on the configuration information and reporting a candidate beam obtained by the measurement, the candidate beam being used by the base station for updating a beam configuration of the first SCell.

9. User equipment (UE), comprising:
   a processor; and
   a memory storing instructions executable by the processor;
   wherein the processor is configured to:
   determine that a first secondary cell (SCell) has a beam failure;
   determine a target serving cell for transmitting a report message to a base station, the report message being configured to notify the base station that the first SCell has the beam failure; and
   transmit the report message in the target serving cell,
   wherein determining the target serving cell for transmitting the report message to the base station comprises:
   taking a primary secondary cell (PSCell) of the UE as the target serving cell for transmitting the report message to the base station, the first SCell belonging to a secondary cell group (SCG) controlled by a SCell base station,
   wherein transmitting the report message in the target serving cell comprises:
   carrying the report message by a resource for a scheduling request (SR) on a Physical Uplink Control Channel (PUCCH) of the target serving cell, the report message comprising a cell identifier of the first SCell and indication information for indicating that the beam failure occurs.

* * * * *